United States Patent
Petolino, Jr.

(10) Patent No.: US 8,386,748 B2
(45) Date of Patent: Feb. 26, 2013

(54) ADDRESS TRANSLATION UNIT WITH MULTIPLE VIRTUAL QUEUES

(75) Inventor: Joseph A. Petolino, Jr., Cupertino, CA (US)

(73) Assignee: Apple Inc., Cupertino, CA (US)

( * ) Notice: Subject to any disclaimer, the term of this patent is extended or adjusted under 35 U.S.C. 154(b) by 731 days.

(21) Appl. No.: 12/608,605

(22) Filed: Oct. 29, 2009

(65) Prior Publication Data

US 2011/0107057 A1    May 5, 2011

(51) Int. Cl.
*G06F 12/08* (2006.01)
(52) U.S. Cl. ......... 711/207; 711/203; 711/205; 711/206
(58) Field of Classification Search .................. None
See application file for complete search history.

(56) References Cited

U.S. PATENT DOCUMENTS

| | | |
|---|---|---|
| 2007/0180158 A1 | 8/2007 | Irish |
| 2007/0283121 A1 | 12/2007 | Irish |
| 2009/0158004 A1 | 6/2009 | Hasegawa et al. |

OTHER PUBLICATIONS

International Search Report and Written Opinion in Application No. PCT/US2010/054702 mailed Feb. 22, 2011.

*Primary Examiner* — Matthew Bradley
*Assistant Examiner* — Alan Otto
(74) *Attorney, Agent, or Firm* — Lawrence J. Merkel; Meyertons, Hood, Kivlin, Kowert & Goetzel, P.C.

(57) ABSTRACT

An address translation unit includes a translation lookaside buffer (TLB), a miss queue, and a control unit. The TLB may store a plurality of address translations. The miss queue may store received address translation requests that missed in the TLB. The miss queue includes a plurality of entries. At least some entries may each store a respective address translation request and a corresponding identifier. The corresponding identifier of a given entry identifies another entry in the miss queue that stores another respective address translation request having a process ordering constraint that is the same as a process ordering constraint of the respective address translation request in the given entry. Address translations having a same ordering constraint that are linked together via the identifier belong to the same virtual miss queue. The control unit may process the received address translation requests in an order dependent upon the identifier.

21 Claims, 5 Drawing Sheets

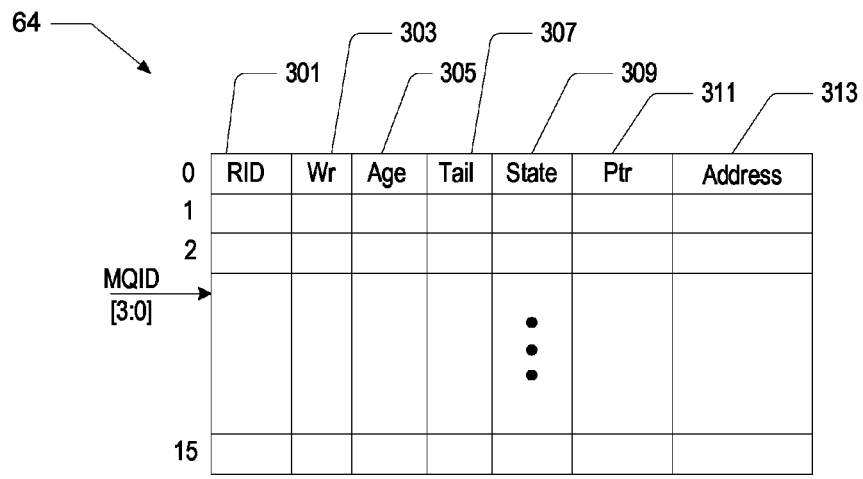
FIG. 3
FIG. 4A
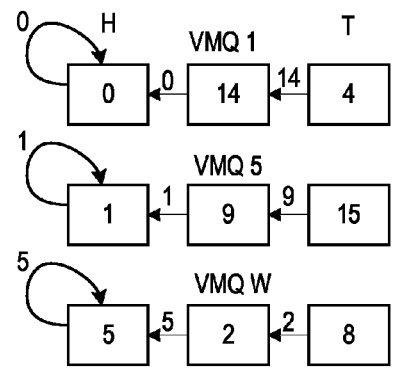
FIG. 4B

ADDRESS TRANSLATION UNIT WITH MULTIPLE VIRTUAL QUEUES

BACKGROUND OF THE INVENTION

1. Field of the Invention

This invention relates to digital processing systems and, more particularly, to address translation mechanisms in such systems.

2. Description of the Related Art

Address translation is often used in systems that include multiple memory request sources and a memory shared by the sources. The sources can include processors, direct memory access (DMA) units acting on behalf of various peripheral devices, and/or the peripheral devices themselves. Address translation may be used to ensure that different sources do not interfere with each other's access to memory, to provide a larger virtual memory than is actually available in the physical memory (along with software to page data in and out of the memory as needed), to simplify the dynamic allocation of memory (allowing scattered pages of real memory to appear as a contiguous block of virtual memory), etc. Thus, a given source may transmit a memory request with a virtual address, and the address translation mechanism may translate the address to a corresponding physical address.

Typically, the virtual to physical address translations are stored in a set of software-managed page tables in memory. The virtual address can be used as an index (relative to a base address of the page table) from which a page table entry or entries is read in order to locate the correct translation. Some address translation schemes use multiple page table reads in a hierarchical or non-hierarchical fashion to locate a translation. Other schemes can use a single page table read to locate a translation.

The latency for performing the translation can be reduced by providing a translation lookaside buffer (TLB) that caches recently used translations for rapid access in response to a memory request from a source. However, in some conventional translation mechanisms, since the TLB may be shared among multiple sources, a TLB miss on one translation may increase the latency of another unrelated translation request. This type of latency may be unacceptable in some systems.

SUMMARY

Various embodiments of an address translation unit including multiple virtual queues are disclosed. In one embodiment, the translation unit includes a translation lookaside buffer (TLB), a miss queue, and a control unit. The TLB may be configured to store a plurality of address translations. The miss queue may be configured to store received address translation requests that missed in the TLB. The miss queue includes a plurality of entries. At least some entries may each be configured to store a respective address translation request and a corresponding identifier. The corresponding identifier of a given entry identifies another entry in the miss queue that stores another respective address translation request such as a next older translation request, having a process ordering constraint that is the same as a process ordering constraint of the respective address translation request in the given entry. For example, address translations having a same ordering constraint and that are linked together via the identifier belong to a same virtual miss queue. The control unit may be configured to process the received address translation requests in an order dependent upon the identifier of each respective address translation request.

BRIEF DESCRIPTION OF THE DRAWINGS

FIG. 3 is a block diagram of one embodiment of the address translation unit miss queue shown in FIG. 2.

FIG. 4A is a diagram depicting various entries within an embodiment of the miss queue of FIG. 2 and FIG. 3.

FIG. 4B is an architectural diagram depicting linked entries of three virtual queues within an embodiment of the miss queue of FIG. 2 through FIG. 4A.

Figure 1:
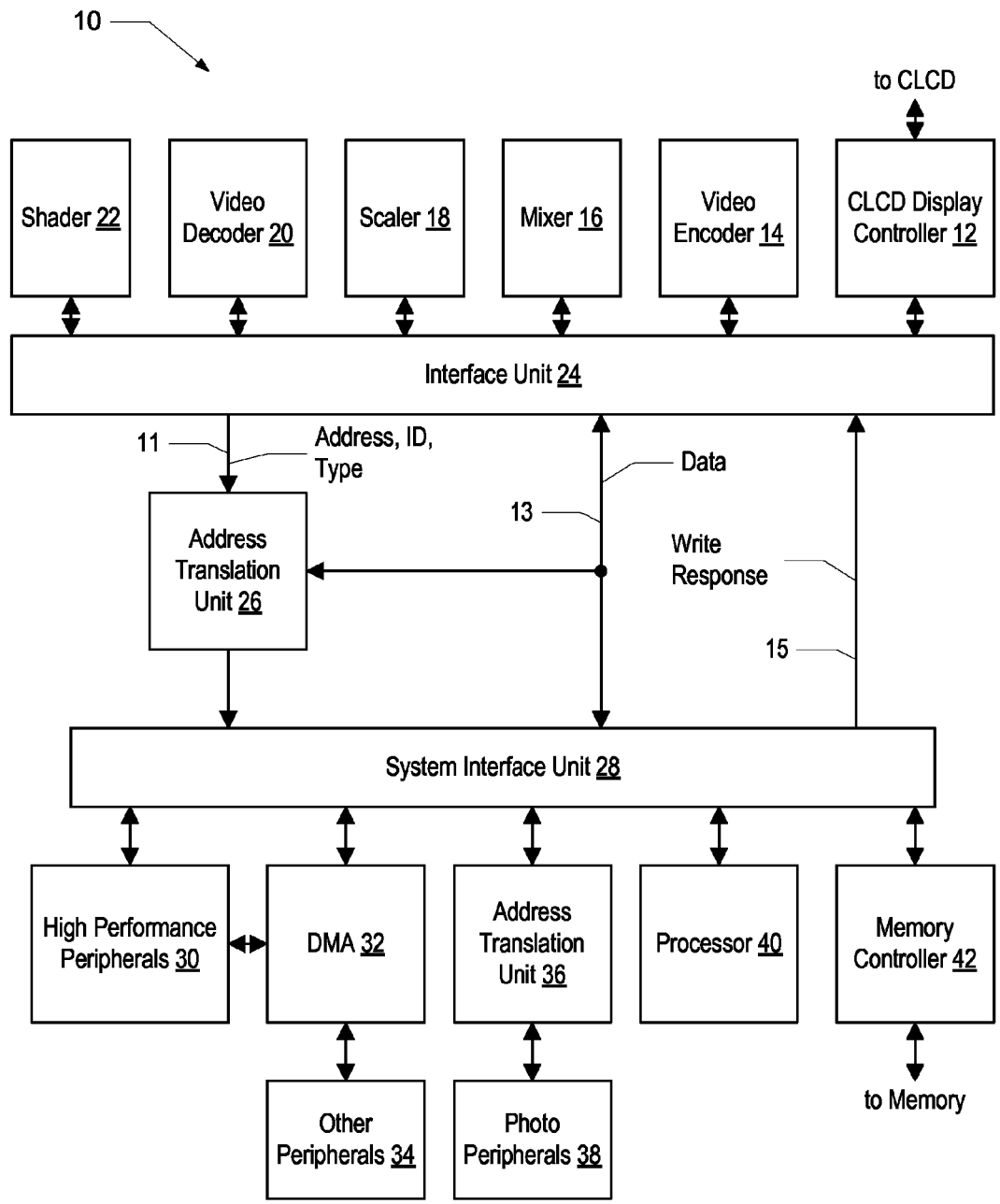
FIG. 1 is a block diagram of one embodiment of a system including one or more address translation units.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION

Turning now to FIG. 1, a block diagram of one embodiment of a system 10 is shown. The system 10 includes a color liquid crystal display (CLCD) display controller 12, a video encoder 14, a mixer 16, a scaler 18, a video decoder 20, a shader 22, an interface unit 24, an address translation unit 26, a system interface unit (SIU) 28, one or more high performance peripherals 30, a direct memory access (DMA) unit 32, one or more other peripherals 34, a second address translation unit 36, one or more photo peripherals 38, a processor 40, and a memory controller 42.

As shown in FIG. 1, the CLCD display controller 12, the video encoder 14, the mixer 16, the scaler 18, the video decoder 20, and the shader 22 are coupled to the interface unit 24, which is further coupled to the system interface unit 28. In the illustrated embodiment, the interface unit 24 is coupled to the system interface unit 28 via an interconnect that includes an address interconnect 11, a data interconnect 13, and a write response interconnect 15 as shown in FIG. 1. The address translation unit 26 is coupled to the address interconnect 11 and may be configured to translate addresses of requests transmitted by the interface unit 24 to the system interface unit 28. The high performance peripherals 30, the DMA unit 32, the address translation unit 36, the processor 40, and the memory controller 42 are coupled to the system interface unit 28. The DMA unit 32 is coupled to the high performance peripherals 30 and the other peripherals 34. The address translation unit 36 is coupled to the photo peripherals 38. The memory controller 42 is coupled to a memory (not shown). The CLCD display controller 12 is coupled to a CLCD (possibly through other components not shown in FIG. 1). In one embodiment, the system 10 as illustrated in FIG. 1 may be integrated onto a single integrated circuit chip as a system-on-a-chip (SOC). In other embodiments, two or more integrated circuits may be employed to provide the components illustrated in FIG. 1. In other embodiments, the system 10 may further include the CLCD, the memory, and various other components (e.g. components coupled to a peripheral interface).

As mentioned previously, the address translation unit 26 may provide address translation for requests initiated by one or more of the components that are coupled to the interface unit 24. For example, in one embodiment, the address translation unit 26 may provide address translation for the CLCD display controller 12, the video encoder 14, the mixer 16, the scaler 18, and the shader 22. However, the video decoder 20 may employ an internal address translation mechanism. Other embodiments may use the address translation unit 26 for address translation for different subsets of the components, or for all of the components, as desired.

Generally, the process of address translation (or more briefly, "translation") may refer to modifying a virtual address input to the address translation unit to a physical address that may be used to access memory. The physical address may often be numerically different from the virtual address, although it is possible to map a virtual address to a numerically equal physical address, often referred to as a unity mapping. The translation is determined based on data stored in one or more page tables in memory, which map virtual addresses to physical addresses on a page granularity. Software may control the mappings of virtual addresses to physical addresses by modifying the contents of the page tables. Pages sizes may vary from embodiment to embodiment. For example, 4 kilobytes is a typical page size, although larger page sizes are supported in various embodiments, up to Megabytes in size. Even larger page sizes may be supported in the future. In some embodiments, multiple page sizes are supported and may be programmably selectable and/or there may be mixed sizes in use at the same time. A specific mapping from a virtual page to a physical page may also be referred to as a translation.

The address translation unit 26 may include a translation lookaside buffer (e.g., TLB 70 shown in FIG. 2), which may cache one or more translations that have been recently used by the address translation unit 26. In one embodiment the TLB may be implemented as a pipelined structure, including a number of stages. Thus, low latency translation may be performed for virtual addresses that hit in the TLB, and somewhat higher latency translation may be performed for a virtual address that misses in the TLB (since a table walk of the page tables in memory is needed to obtain the translation). However, as described further below, the address translation unit 26 may employ a TLB miss queue (e.g., MQ 64 of FIG. 2) that may reduce latencies associated with certain translations by allowing a number of translation requests that have missed in the TLB to be concurrently in-progress.

One or more of the components for which the address translation unit 26 provides address translation may be latency sensitive components that may not tolerate frequent misses in the TLB. For example, the CLCD display controller may read data from memory to display an image on the CLCD display (e.g. frame buffer data). The addresses of these memory read operations may be translated by the address translation unit 26. The display controller is displaying the image on the display for the user to view, and unexpected latency in reading the data may lead to visible effects on the display. The video encoder 14 may also be sensitive to latency in reading memory, as may the video decoder 20 (although the video decoder 20 includes its own address translation unit, in this embodiment). Any video processing unit may be sensitive to memory read latency, in various embodiments. A video processing unit may be any circuitry that processes video data. The video processing units may include, e.g., the display controller 12, the video encoder 14, the mixer 16, the scaler 18, the video decoder 20, and/or the shader 22. Video processing units may also include any other circuitry that processes video data. In the present embodiment, the display controller 12 and the video encoder 14 are sensitive to memory read delay, and other components are not latency sensitive or include their own address translation unit. Other embodiments may have more or fewer video processing units that are latency sensitive.

Accordingly, TLB miss queue (shown in FIG. 2) may track in-progress TLB misses, and allow for concurrent processing of translation requests while enforcing translation request ordering constraints for translations having the same ARID or among all write translations. As described in greater detail below in conjunction with the descriptions of FIG. 2 through FIG. 6, the miss queue may employ a number of virtual miss queues (VMQ) within a physical miss queue storage structure. More particularly, in one embodiment, a storage unit may include a number of entries that store translation requests. Each entry in the miss queue may store a translation belonging to any VMQ. Each VMQ may be implemented as a linked list type of data structure in which new translation requests may be appended to a tail of the appropriate VMQ. In one embodiment, each entry may include a pointer for identifying a miss queue entry in which a next sequential translation request in the same VMQ is stored. Each translation request in a given VMQ may have the same process ordering constraints and may be processed in the order specified by the pointers. However, translation requests in different VMQs may not block each other and requests that are ready may be selected using a selection mechanism such as that described further below.

As illustrated in FIG. 1, the address translation unit 26 may receive the address interconnect 11, which may include an address, an identifier, and a type (e.g. read/write). Various other information may be included in a request as well (e.g., a size), in various embodiments. In one implementation, the address interconnect 11 may include separate channels for read and write requests. Accordingly, there may be a read address, a write address, a read identifier, and a write identifier. The read/write nature of the request may be inferred from which of the channels that are being used to transmit the request. Other embodiments may use other interconnects, packet based interconnect, etc. For example, an address interconnect that transmits one address and a read/write indication may be used.

The data interconnect 13 may include a write data channel and a read data channel, or may be a bidirectional interconnect, in various embodiments. The address translation unit 26 may be coupled to the data interconnect 13 to receive read data from table walks for TLB misses. The write response interconnect 15 supplies responses for write requests (e.g. a completion indication).

The interface unit 24 may receive requests from the components 12, 14, 16, 18, 20, and 22 (or indications that requests are ready to be transmitted) and may be configured to arbitrate among the requests when there are conflicts. The interface unit 24 may be configured to transmit the requests on the address interconnect, and to route corresponding write data and read data to/from the data interconnect. Received write responses may be routed to the source of the corresponding write request.

The system interface unit 28 may be a "top level" interface connecting the various components of the system 10 and providing communication therebetween. The system interface unit may have similar interconnect to that shown with the interface unit 24, to couple to other components in the system 10.

The CLCD display controller 12 is configured to control the image displayed on the CLCD. For example, a frame buffer stored in memory may store the data that identifies the color that each pixel of the display should show, and the display controller 12 may read the frame buffer and display the image described by the frame buffer on the display. While a CLCD display controller is illustrated in FIG. 1, other embodiments may implement any display controller, configured to control any type of display.

The video encoder 14 may be configured to encode video streams using any desired coding scheme. Encoding schemes may include motion picture experts group (MPEG) versions 1-4 or any subsequent version, or any other video compression or coding scheme. Similar, the video decoder 20 may be configured to decode video streams that were encoded using any desired coding scheme. While the video decoder 20 includes its own address translation unit in this embodiment, other embodiments may include a video decoder 20 that uses the address translation unit 26. In such embodiments, the video decoder 20 may also be a latency sensitive request source, and may have a way or ways assigned to it in the latency sensitive partition of the TLB memory.

The mixer 16 may be configured to perform video mixing operations. The scaler 18 may be configured to perform video scaling operations. The shader 22 may be configured to perform pixel shading operations. Generally, the mixing, scaling, and shading may be part of generating a frame for display.

The high performance peripherals 30 may include various peripherals that are expected to generate significant bandwidth on the system interface unit 28, at least as compared to the other peripherals in the system 10. For example, in one embodiment, the high performance peripherals may include a networking media access controller (MAC) such as an Ethernet MAC, a wireless fidelity (WiFi) controller, and a universal serial bus (USB) controller. Other embodiments may include more or fewer peripherals, and may categorize and/or arrange the peripherals differently. For example, the MAC and USB controller may be medium performance peripherals, whereas the WiFi controller may be a low performance peripheral. The other peripherals 34 may include various lower bandwidth peripherals such as an audio subsystem, flash memory interface, general purpose input/output (I/O), timers, an on-chip secrets memory, an encryption engine, etc., or any combination thereof. The DMA unit may be configured to perform transfers to and from the memory through the memory controller 42 on behalf of the high performance peripherals 30 and other peripherals 34.

The address translation unit 36 may be configured to translate addresses from the photo peripherals 38, which may include a camera interface, a joint photographic experts group (JPEG) coder/decoder (codec), and a video encoder, in one embodiment. Other embodiments may include other sets of photo peripherals 38. In one embodiment, the address translation unit 36 may be implemented using a micro-architecture similar to that used in the address translation unit 26, although other implementations are contemplated.

The processor 40 may implement any instruction set architecture, and may be configured to execute instructions in that instruction set architecture. The processor 40 may employ any microarchitecture, including scalar, superscalar, pipelined, superpipelined, out of order, in order, speculative, non-speculative, etc., or combinations thereof. The processor 40 may include circuitry, and optionally may implement microcoding techniques.

The memory controller 42 may be configured to receive memory requests from the system interface unit 28 (which may have received the requests from one or more other components as shown in FIG. 1). The memory controller 42 may access memory to complete the requests (writing received data to the memory for a write request, or providing data from the memory in response to a read request). The memory controller 42 may be configured to interface with any type of memory, such as dynamic random access memory (DRAM), synchronous DRAM (SDRAM), double data rate (DDR, DDR2, DDR3, etc.) SDRAM, RAMBUS DRAM (RDRAM), static RAM (SRAM), etc. The memory may be arranged as multiple banks of memory, such as dual inline memory modules (DIMMs), etc.

It is noted that other embodiments may include other combinations of components, including subsets or supersets of the components shown in FIG. 1 and/or other components. While one instance of a given component may be shown in FIG. 1, other embodiments may include one or more instances of the given component. In addition, in other various embodiments, other components that may be coupled to the system interface unit 28, or portions of the other components, may also be coupled through an interface unit (not shown) similar to the interface unit 24. Alternatively, the interface unit 24 may be eliminated and the components coupled thereto may be coupled to the system interface unit 28 directly. However, in such alternative embodiments, the address portion of the connection may include the address translation unit 26.

Figure 2:
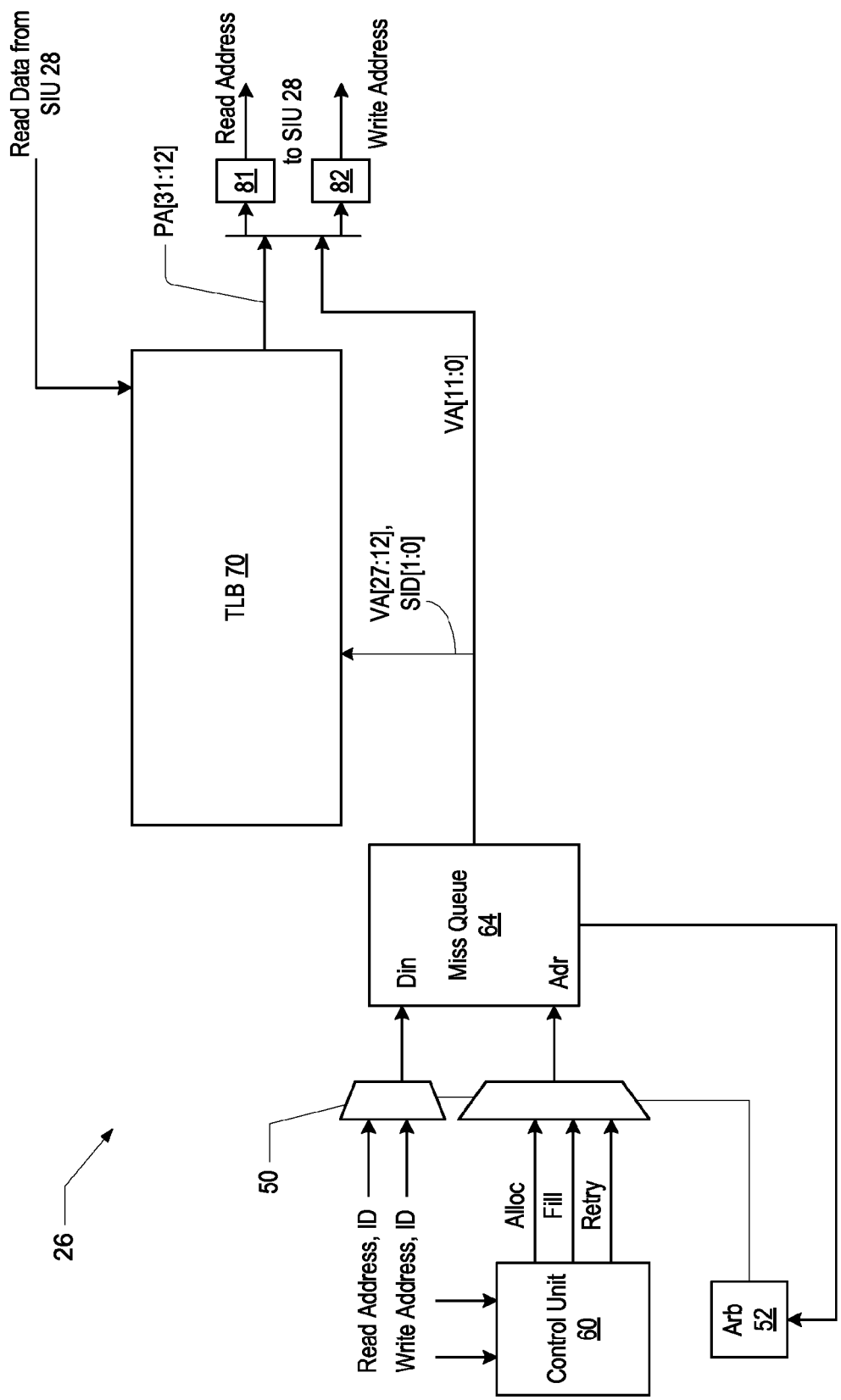
FIG. 2 is a block diagram of one embodiment of an address translation unit shown in FIG. 1.

Turning now to FIG. 2, a block diagram of one embodiment of the address translation unit 26 is shown. In the embodiment of FIG. 2, the address translation unit 26 includes a control unit 60, a multiplexer unit (mux) 50, an arbiter 52, a miss queue (MQ) 64, a TLB 70, and physical address output registers 81 and 82. As shown, the control unit 60 is coupled to the mux 50. Both the control unit 60 and the mux 50 are coupled to receive the read address and read identifier (RID), and the write address and write identifier (WID), as described above. The mux 50 is coupled to the MQ 64, and the mux select input is coupled to the arbiter 52. The MQ 64 is coupled to the TLB 70 and to the output registers 81 and 82. The output of the TLB 70 is also coupled to the output registers 81 and 82. Lastly, the TLB 70 is coupled to receive read data from the SIU 28.

The control unit 60 may allocate an entry in each clock cycle of the address translation unit clock, so that in the event that a translation request arrives, an entry is already allocated. When an address translation request is received from the interface unit 24, it is stored in an allocated entry in the MQ 64 for several cycles as the translation moves through the TLB pipeline, even though there may be a hit in the TLB 70. As described in greater detail below in conjunction with the description of FIG. 5, if there is a hit, the entry may go idle as the physical address is provided to the SIU 28 via the output registers 81 and 82. However, if there is a TLB miss, the translation may stay in the MQ 64 while the translation is being performed. When the translation completes and the read data is provided into the TLB 70, the translation may be retried. The control unit 60 may be notified of the TLB fill, and in response, the control unit 60 may transition the corresponding entry to the ready or "queued" state. In one embodiment, there may be several translations that are ready. Accordingly, each cycle the arbiter 52 may determine which ready translation may be retried depending on such factors as how old each ready translation is, for example.

In one embodiment, the MQ 64 may include a number of entries. The MQ 64 may be addressed using an MQ identifier (MQID), which may be assigned to each translation as it enters the address translation unit 26. Each entry may store any type of translation. However, read address translation requests with the same RID, and all write address translation requests must follow certain ordering constraints. For example, in one embodiment, all read address transfers with a given RID value must appear on the SIU 28 in the same order as they appeared on the interface 24, and all write address transfers regardless of WID value, must appear on the SIU 28 in the same order as they appeared on the interface 24. Accordingly, as described further below, in one embodiment read translations having a same RID may be linked together to form a virtual miss queue (VMQ). Similarly, all write translation requests may linked together to form a single VMQ. Thus the address translations in a given VMQ have the same ordering constraints and must be processed in a particular order (e.g., the order in which they were received). However, translation requests in different VMQs do not. Thus across different VMQs, the translation requests may be processed in any order. The control unit 60 may keep track of the position of each translation in a given VMQ by accessing information associated with each entry.

As described further below in conjunction with the description of FIG. 3, when a translation is stored in the MQ 64, it may be stored with status information that may identify to which RID or WID, and thus to which VMQ, a transaction belongs. The information may also identify whether a given entry is the head or the tail of a VMQ. The information may also include a pointer that indicates the next older translation in a given VMQ.

Turning to FIG. 3, a block diagram of one embodiment of the address translation unit miss queue 64 of FIG. 2 is shown. The MQ64 of FIG. 3 is a storage including a number of entries for storing translations. In the illustrated embodiment, the MQ 64 includes 16 entries numbered zero through 15. Each entry includes the translation virtual address 313, read identifier (RID) 301, a write indicator (Wr), and age indicator (Age) 305, a tail indicator 307, a state indicator 309, and a VMQ pointer (Ptr) 311. In one embodiment, since all write translations belong to the same VMQ, a separate WID storage is not necessary. Instead, a single write bit may be used. However, in other embodiments an additional WID storage may be used in lieu of the Wr indicator, or in addition to the Wr indicator as desired.

In various embodiments, the storage that makes up the MQ 64 may be implemented as any type of storage. For example, in one embodiment the MQ 64 may be implemented using a single port 16-entry register file, although, other numbers of entries may be used. Each entry may be independently addressed via the MQID as described above. The register file may be implemented using a random access memory (RAM) array in the static RAM family, although any type of memory device may be used. In addition, although the each entry in the MQ 64 is shown to include all of the information fields, it is contemplated that in some embodiments, some of the information such as the VMQ Ptr 311 and the RID 301, for example, may be stored in separate registers that are concurrently accessed with each entry.

As described above, the control unit 60 may access the MQ 64 using an MQID. In the illustrated embodiment, the MQID is a four-bit identifier, each count of which corresponds to one of the 16 entries. The RID 301 may indicate to which read VMQ a given entry belongs. As described further below, in one embodiment all translations having the same RID belong to the same VMQ and all writes belong to one VMQ. The Wr indicator 303 indicates if the translation is a write translation. The Age indicator 305 indicates the age of each entry relative to each other entry. For example, in one embodiment, the Age indicator 305 may be a four-bit indicator corresponding to the 16 entries in the MQ 64. The tail indicator 307 may indicate whether the entry is the tail of a given VMQ, and in one embodiment the tail indicator 307 may be a single bit. The state indicator 309 indicates the present state of the entry. As described in greater detail below, each entry of the MQ 64 may be in one of six states. Accordingly, in one embodiment, the state indicator 309 may be a three-bit indicator. The address 313 may store some number of the virtual address bits of the translation request.

The Age indicator 305 may track the age of each entry such that if there are N entries in the MQ 64, the Age indicators 305 contain a sequence of values from zero (the youngest entry) to N−1 (the oldest entry). Accordingly, in one embodiment the Age indicator 305 may be a four-bit value. As each entry is linked into a VMQ, the Age indicator 305 for that entry may be set to zero, and the Age indicators 305 of all other valid entries are incremented by one. When a translation is removed such as when a translation completes, the Age indicators 305 of all older valid entries are decremented by one.

As mentioned above, all entries that have a same RID belong to the same VMQ, and all write entries belong to one VMQ. Thus, each entry in a particular VMQ may be linked together using a pointer in a linked list type structure. Accordingly, the Ptr 311 is a VMQ pointer having a value that points to the next oldest entry within a given VMQ. If the entry is the head of the VMQ, the pointer value points to itself. If the entry is the tail of the VMQ, the pointer value points to the next older entry in that VMQ. This type of pointer mechanism may be referred to as a reverse pointer, since the pointer starts at the tail and points forward in the list to the next oldest until the head is reached. Each time a translation is received that belongs to a VMQ with entries in the MQ 64, the new translation may be appended to the tail of the list. For example, an entry is allocated and the address is stored. The control unit 50 resets the tail indicator 307 of the previous tail entry, sets the tail indicator 307 of the new entry, and causes the VMQ Ptr 311 value of the new entry to point to the previous tail entry. When a head entry is removed from the queue, the control unit 50 updates the pointer of the next younger entry in that VMQ and causes the VMQ Ptr 311 to point to itself. That is, the control unit 50 writes the entry MQID value of the next younger value into the VMQ Ptr 311.

It is contemplated that in an alternative embodiment, the linked VMQ Ptr 311 may point to the next youngest entry in a VMQ. Accordingly, in such an embodiment the linked entries may start at the head entry and successively point to the next youngest entry until the tail is reached. In addition, instead of a tail indicator, a head indicator may be used, and the VMQ pointer value of the tail entry may point to itself.

To illustrate the above reverse VMQ entry linking, an exemplary embodiment of MQ 64 is shown in FIG. 4A. Referring to FIG. 4A, the MQ 64 includes 16 entries. However, only a subset of the information is shown here for simplicity. As shown, the MQ 64 includes three active virtual miss queues each having three entries. The three VMQs are identified by the RID value or the Wr indicator. More particularly, one VMQ includes three entries having an RID of 1 (VMQ 1), a second VMQ includes entries having an RID of 5 (VMQ 5), and the third VMQ includes those entries having the Wr indicator set to a logic value of one (VMQ W).

As shown, the tail entry of the VMQ 1 is located in entry four as evidenced by the tail indicator being set. The VMQ Ptr value is fourteen, thus pointing to the next oldest entry in VMQ 1. The VMQ Ptr value in entry 14 is zero, which points to the next oldest entry in VMQ 1 and located in entry zero. The VMQ Ptr value in entry zero is zero. This indicates that entry zero is the head of VMQ 1 (and is so indicated in FIG. 4A by an 'H').

Similarly, the tail entry of the VMQ 5 is located in entry 15 as evidenced by the tail indicator being set. The VMQ Ptr value is nine, thus pointing to the next oldest entry in VMQ 1. The VMQ Ptr value in entry nine is one, which points to the next oldest entry in VMQ 1 and located in entry one. The VMQ Ptr value in entry one is one. This indicates that entry one is the head of VMQ 1. In the VMQ W, the tail entry is located in entry eight as evidenced by the tail indicator being set. The VMQ Ptr value is two, thus pointing to the next oldest entry in VMQ W. The VMQ Ptr value in entry two is five, which points to the next oldest entry in VMQ W and located in entry five. The VMQ Ptr value in entry five is five. This indicates that entry five is the head of VMQ W. Further, within each VMQ, the tail entry is the youngest (i.e., has the lowest age value) and the head entry is the oldest (i.e., has the highest age value).

In FIG. 4B, a simplified architectural diagram depicting linked entries of the three VMQs within an embodiment of the MQ 64 of FIG. 4A is shown. Referring to FIG. 4B, the VMQ 1 is on the top, the VMQ 5 is in the middle and VMQ W is on the bottom. Each of the boxes represents an entry in the MQ 64, the number inside the box represents the entry number or MQID, and the arrow number represents the VMQ Ptr 311 of FIG. 4A. As described above and shown in FIG. 4B, the tail of VMQ 1 is entry four, which points to entry 14, which points to entry zero, which points to itself and is thus the head of VMQ 1. The remaining VMQs (e.g., VMQ 5 and VMQ W) are similarly linked and not described further.

Figure 5:
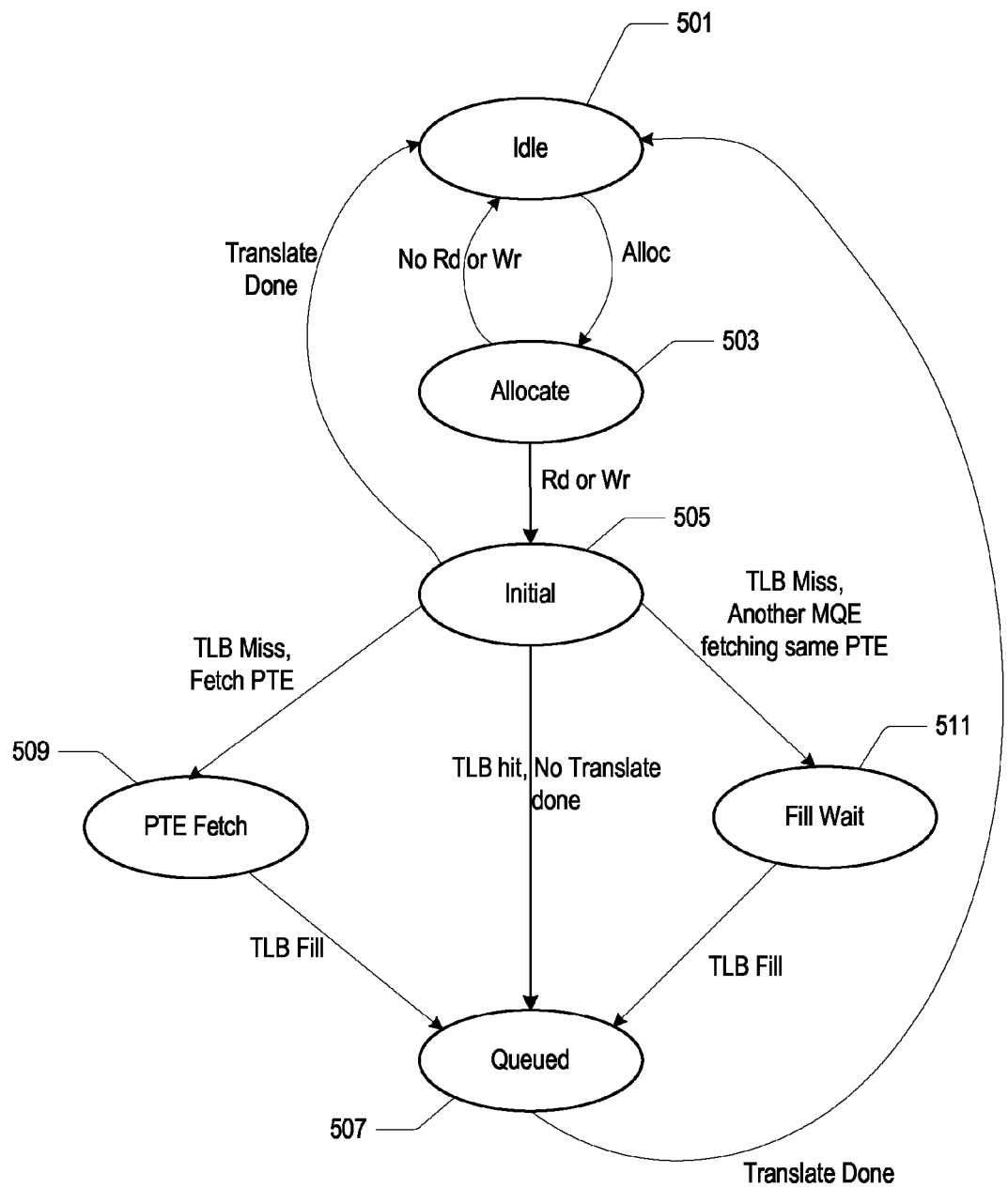
FIG. 5 is a state diagram depicting the operational states of an entry within an embodiment of the miss queue of FIG. 2 and FIG. 3.

Turning to FIG. 5, a state diagram depicting the operational states of an entry within one particular embodiment of the MQ 64 is shown. As shown in the diagram and as mentioned above, each entry in the MQ 64 may be in one of the six states. The states include: Idle 501, Alloc 503, Initial 505, page table entry (PTE) Fetch 509, Fill Wait 511, and Queued 507. The control unit 60 of FIG. 2 may update the state indicator in each entry in response to a condition that would change the state of an entry as described further below.

The Idle state may be used when an entry is not tracking a translation. An Idle entry resembles an empty entry that may be allocated if an entry is needed. An entry in the Alloc state has been allocated for use by the control unit if a translation request is received. In one embodiment, each cycle, the control unit 60 may allocate one entry in the MQ 64 to accept a translation request if one was to arrive. In one embodiment, an entry may stay in the Alloc state for one cycle, and if the entry is not needed, it may be returned to the Idle state at the end of the cycle. If a translation request arrives while the entry is in the Alloc state, that entry would accept the translation, and the entry would transition to the Initial state. In one embodiment, each time a translation does a TLB access, whether an initial access or a retry, the state may be recomputed. The entry will transition to one of the four states (e.g., Idle, PTE Fetch, Fill Wait, or Queued) depending on the outcome of the TLB access.

An entry may stay in the Initial state for a number of cycles, while a translation request travels down the TLB pipeline to check for a TLB miss. In one embodiment, an entry may stay in the Initial state for four cycles awaiting a hit or miss indication. An entry in the Initial state may transition to one of four other states depending on the outcome of the TLB access. More particularly, if there is a TLB hit and the translation completes, the entry transitions to Idle. If there is a TLB miss and a PTE Fetch is started, the entry transitions to the PTE Fetch state. If there is a TLB miss but some other entry is in the PTE Fetch state waiting for the same PTE to be fetched, the entry transitions to the Fill Wait state. If there is a TLB hit, but the translation cannot complete for reasons such as ordering constraints, bus busy, etc, for example, the entry may transition to the Queued state.

An entry in the PTE Fetch state has sent a PTE fetch request to the memory and is awaiting the translation data for that request. When the data is returned to the TLB, the TLB may notify the control unit 60 with a fill notification. The entry may be transitioned to the queued state.

An entry in the Queued state is waiting for a turn to retry perform a translation retry access of the TLB. When a TLB fill occurs or there is a TLB hit, that entry is ready to retry but as described above, the entry may not be the next entry to be retried. Once a retry is performed and the translation is done the entry may transition to the Idle state.

An entry that transitions to the Fill Wait state is awaiting a TLB fill after a TLB miss, but a PTE fetch for the same PTE has already been issued by another translation request in another entry. When the translation data is returned to the TLB, the TLB may notify the control unit 60 with a fill notification. The entry may be transitioned to the queued state.

Figure 6:
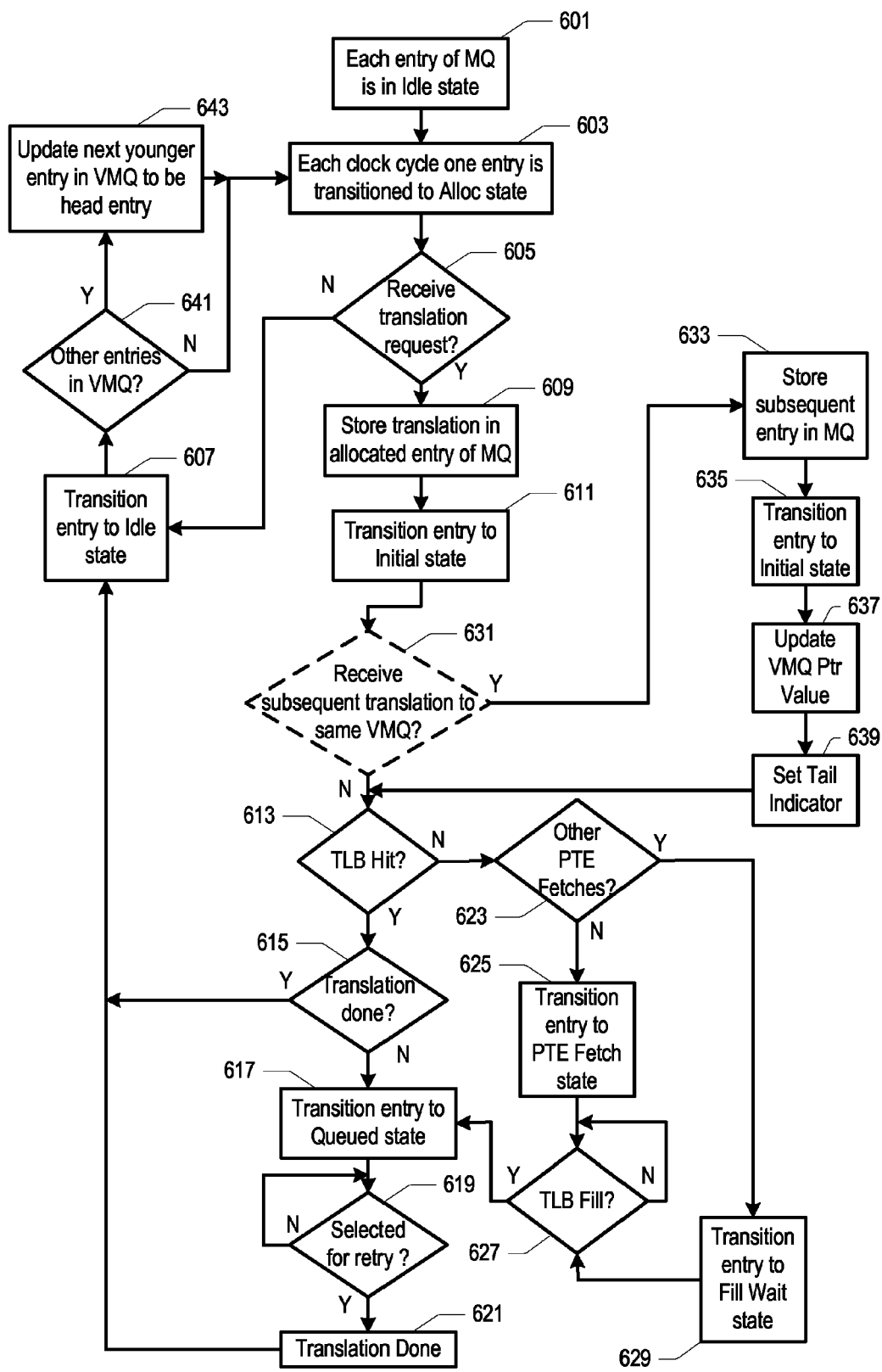
FIG. 6 is a flow diagram depicting the operation of one embodiment of the address translation unit shown in FIG. 2 and FIG. 3.

FIG. 6 is flow diagram depicting the operation of one embodiment of the address translation unit shown in FIG. 2 through FIG. 5. Referring collectively to FIG. 2 through FIG. 6, and beginning in block 601 FIG. 6, all entries in the MQ 64 are in the Idle state. Each bus cycle, the control unit 60 may transition one entry (selected by arbiter 52) in the MQ 64 to the Alloc state in case a translation request is received (block 603). If no Rd or Wr translation request is received (block 605), the control unit 60 may transition that entry back to the Idle state at the end of the cycle (block 607).

However, if a translation request is received (block 605), control unit 60 may store the translation in the allocated entry (block 609), and transition that entry to the Initial state. The entry may stay in the initial state while the translation enters the TLB pipeline and either a hit or miss in the TLB 70 is indicated.

At any stage, if a second or subsequent read translation request having a same RID or a second or subsequent write translation is received while the first or any previous translations are in the MQ 64 (block 631), the control unit 60 is configured to store the second or subsequent request(s) into a next allocated entry of the MQ 64 (block 633). The control unit 60 then writes the entry status information to transition that entry to the Initial state (block 635) and append the entry to the tail of the appropriate VMQ by writing the MQID of the previous tail entry into the VMQ Ptr of the new entry (block 637). The control unit 60 also causes the tail indicator to indicate the new entry is now the tail (block 634). Accordingly, block 631 is shown in dashed lines to indicate that this may occur anywhere in the operational flow. Once the new entry is part of an existing VMQ, the remainder of the operational flow applies to any entry.

If there is a TLB hit (block 613), and the translation is done (block 615), the control unit 60 may transition the entry back to the Idle state (block 607). If the entry is not part of a VMQ with other entries (block 641), operation proceeds as described above in conjunction with block 603. However, if the entry is part of a VMQ with other entries (block 641), the control unit 60 may access the next younger entry in the VMQ, and write the MQID of the next younger into the VMQ Ptr 311, thereby making that entry the head of the VMQ (block 643). Operation proceeds as described above in conjunction with block 603.

Referring back to block 615, if the translation is not done for reasons such as those described above, the control unit 60 may transition the entry to the Queued state (block 617), where the entry may wait for a retry of a TLB access (block 619). Once the retry is granted by the arbiter 52, the translation completes (block 621) and the entry is returned to the Idle state (block 607). In one embodiment, when there is more than one head entry that is in the Queued state and ready to retry the translation access to the TLB 70, the arbiter 52 may determine which entry may be retried using the Age indicator 305. More particularly, the oldest ready entry may be retried first in one embodiment. Operation proceeds as described above in conjunction with block 641.

Referring back to (block 613), if there is a TLB miss, and there is no other entry with a translation request that already performed a PTE Fetch for the same PTE (block 623), a PTE fetch is issued and the control unit 60 may transition the entry to the PTE Fetch state (block 625) to await the TLB fill and the return of the translation data to the TLB 70 (block 627). When the translation data arrives at the TLB 70 the control unit 60 is notified of the TLB fill, and the control unit 60 may transition the entry to the Queued state (block 617) to await a retry of the translation access of the TLB (block 619). When the translation is complete (block 621), the control unit 60 may transition the entry to the Idle state (block 607). Operation proceeds as described above in conjunction with block 603.

On the other hand, if there is a TLB miss (block 613), and another translation request in another entry has already performed a PTE Fetch for that same PTE (block 623), then the control unit 60 may transition the entry to the Fill Wait state (block 629) to await the return of the translation data to the TLB 70 (block 627). When the translation data arrives at the TLB 70 the control unit 60 is notified of the TLB fill, and the control unit 60 may transition the entry to the Queued state (block 617) to await a retry of the translation access of the TLB (block 619). When the translation is complete (block 621), the control unit 60 may transition the entry to the Idle state (block 607). Operation proceeds as described above in conjunction with block 641.

It is noted that that although the operational flow is described and shown in a particular order, it is contemplated that in other embodiments, the operations depicted in the various blocks may be performed in a different order, as desired.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A translation unit comprising:
a translation lookaside buffer (TLB) configured to store a plurality of address translations;
a miss queue coupled to the TLB and configured to store received address translation requests that missed in the TLB, wherein the miss queue includes a plurality of entries, wherein at least some of the plurality of entries are each configured to store a respective address translation request and a corresponding identifier, wherein the corresponding identifier of a given entry identifies another entry in the miss queue that stores another respective address translation request having a process ordering constraint that is the same as a process ordering constraint of the respective address translation request in the given entry; and
a control unit coupled to the miss queue and configured to process the received address translation requests, wherein the control unit is configured to process each respective address translation request in an order that depends upon the identifier of each respective address translation request.

2. The translation unit as recited in claim 1, wherein one or more of the respective address translation requests having the same process ordering constraint belong to a virtual miss queue.

3. The translation unit as recited in claim 2, wherein each virtual miss queue begins with a youngest respective address translation request and ends with an oldest respective address translation request.

4. The translation unit as recited in claim 2, wherein each respective address translation request is linked to the next older respective address translation in the same virtual miss queue by the identifier.

5. The translation unit as recited in claim 2, wherein the entry associated with a youngest respective address translation request of a given virtual miss queue further includes a tail identifier.

6. The translation unit as recited in claim 2, wherein the identifier of an oldest respective address translation request of a given virtual miss queue identifies an entry in the miss queue that stores the oldest respective address translation request of the given virtual miss queue.

7. The translation unit as recited in claim 1, wherein each entry further includes an age indicator that indicates an age of each entry in the miss queue relative to each other entry storing a valid respective address translation request.

8. The translation unit as recited in claim 6, further comprising an arbiter coupled to the miss queue and configured to select for retry, a particular respective address translation request in response to receiving a notification that an address translation corresponding to the particular respective address translation request has been stored in the TLB.

9. The translation unit as recited in claim 8, wherein the arbiter is configured to select among a plurality of respective address translation requests for which corresponding address translations have been stored in the TLB, based upon the age indicator of each of the plurality of respective address translation requests.

10. A translation unit comprising:
- a translation lookaside buffer (TLB) configured to cache a plurality of address translations;
- a miss queue coupled to the TLB and configured to store translation requests that missed in the TLB, wherein at least some of the translation requests in the miss queue include an identifier that identifies a prior translation request in the miss queue that belongs to a same virtual miss queue (VMQ); and
- a control unit coupled to the miss queue and configured to process the translation requests, wherein the control unit is configured to process translation requests in the same VMQ, in order, responsive to each identifier.

11. The translation unit as recited in claim 10, wherein a given VMQ includes one or more address translation requests having a same process ordering constraint.

12. The translation unit as recited in claim 10, wherein each VMQ includes an oldest translation request, wherein the control unit is configured to cause the identifier of each oldest translation request to identify the oldest translation request of the corresponding VMQ, thereby identifying a head of the corresponding VMQ.

13. The translation unit as recited in claim 10, wherein in response to receiving a new translation request, the control unit is configured to append the new translation request to an end of a given VMQ that includes a youngest translation request of the given VMQ, and to cause a second identifier of the new translation request to identify the youngest translation request.

14. The translation unit as recited in claim 10, wherein the control unit is configured to maintain each translation request of each VMQ in one of a plurality of states, wherein in response to receiving a notification that an address translation corresponding to a given translation request has been stored in the TLB, the control unit is further configured to transition the given translation request to a queued state.

15. The translation unit as recited in claim 14, further comprising an arbiter coupled to the miss queue and configured to select for retry each cycle, an oldest translation request among all translation requests in the queued state.

16. A method comprising:
- a translation lookaside buffer (TLB) storing a plurality of address translations;
- a miss queue storing received address translation requests that missed in the TLB, wherein the miss queue includes a plurality of entries, wherein at least some of the plurality of entries storing a respective address translation request and a corresponding identifier, wherein the corresponding identifier of a given entry identifies another entry in the miss queue that stores another respective address translation request having a process ordering constraint that is the same as a process ordering constraint of the respective address translation request in the given entry; and
- a control unit processing each respective address translation request in an order that is dependent upon the identifier of each respective address translation request.

17. The method as recited in claim 16, wherein one or more of the respective address translation requests having the same process ordering constraint belong to a virtual miss queue.

18. The method as recited in claim 17, further comprising, within each virtual miss queue, appending a new respective address translation request to a youngest respective address translation request by causing the identifier of the new respective address translation request to identify the youngest respective address translation request and causing a second identifier of the new respective address translation request to identify the new respective address translation request as new youngest translation request.

19. The method as recited in claim 16, further comprising maintaining an indicator to indicate an age of each entry in the miss queue relative to each other entry in the miss queue.

20. The method as recited in claim 19, further comprising selecting for retry each cycle, an oldest respective address translation request among all respective address translation requests in a ready state.

21. A system comprising:
- one or more devices;
- a translation unit coupled to the one or more devices via an interface unit and configured to provide a plurality of address translations for the one or more devices, wherein the translation unit comprising:
- a translation lookaside buffer (TLB) configured to store the plurality of address translations;
- a miss queue coupled to the TLB and configured to store received address translation requests that missed in the TLB, wherein the miss queue includes a plurality of entries, wherein at least some of the plurality of entries are each configured to store a respective address translation request and a corresponding identifier, wherein the corresponding identifier of a given entry identifies another entry in the miss queue that stores another respective address translation request having a process ordering constraint that is the same as a process ordering constraint of the respective address translation request in the given entry; and
- a control unit coupled to the miss queue and configured to process the received address translation requests, wherein the control unit is configured to process each respective address translation request in an order that depends upon the identifier of each respective address translation request.

* * * * *